May 25, 1965 R. L. BREITHAUPT ETAL 3,185,324
MATERIAL HAULAGE VEHICLE
Filed May 9, 1961 7 Sheets-Sheet 4

INVENTORS.
RICHARD L. BREITHAUPT, &
HOWARD J. THOMAS.
BY
their
ATTORNEY.

United States Patent Office 3,185,324
Patented May 25, 1965

3,185,324
MATERIAL HAULAGE VEHICLE
Richard L. Breithaupt, Ashland, Ky., and Howard J. Thomas, Huntington, W. Va., assignors to National Mine Service Company, Pittsburgh, Pa., a corporation of West Virginia
Filed May 9, 1961, Ser. No. 108,910
5 Claims. (Cl. 214—83.36)

This invention relates to haulage vehicles and more particularly to haulage vehicles adapted for use in hauling loose material in underground trackless mines.

Although capable of use with various types of vehicles, the present invention is particularly adaptable to shuttle cars which are vehicles designed for carrying loose material, such as coal, from a loading machine at the working face of a mine to an entry conveyor or mine cars. In designing a shuttle car of this type, cognizance must be taken of the fact that the mine roof is often very low, meaning that the shuttle car is limited in height and must have a material-receiving compartment with a low bottom to accommodate loads of any appreciable size. Furthermore, since the usual shuttle car comprises a rigid body supported on four wheels, the length of the car is limited due to the fact that the mine roadway does not necessarily follow a straight path but may have rises or falls therein which the shuttle car must negotiate. That is, if the length of a conventional rigid body shuttle car is too great, it will jam against the roof of the mine or possibly drag along the bottom in negotiating the aforementioned rises and falls in the mine roadway, particularly in the case of low height mines.

As an overall object, the present invention seeks to provide a new and improved articulated vehicle capable of negotiating rises or falls in a mine roadway while at the same time having a greater length than a conventional shuttle car. In this manner, the height of the car may be reduced, if necessary, for particularly low mines without any sacrifice in load-carrying capacity. Shuttle cars of this general type have been proposed in the past such as that shown in Russell Patent 2,962,176, issued November 29, 1960. The shuttle car shown in this patent comprises an elongated body having a pair of tandem body parts which are connected at adjacent ends by laterally-extending pivot means. A single set of non-steerable traction wheels are provided adjacent the pivot axis of the two body parts, while steerable wheels are provided at either end of the elongated body, the arrangement being such that the shuttle car may be steered by turning one set of steerable wheels in one direction while turning the other set in the opposite direction to rotate the body about the traction wheels.

One of the difficulties with a car of the type described above is that the entire motive force for the car is applied to only one set of wheels, meaning that in cases where the mine floor is of loose or soft material, the drive wheels may slip due to insufficient traction.

In the present invention, on the other hand, this difficulty is eliminated, or greatly improved, by an arrangement wherein the motive force for the shuttle car is applied to a plurality of sets of drive wheels arranged in tandem under one of the body parts. This not only improves the overall traction characteristics of the vehicle, but also enables the use of a single prime mover for driving all of the traction wheels.

Another object of the invention is to provide a new and improved arrangement for steering an articulated vehicle of the type described above. As was mentioned, prior art systems for steering articulated vehicles employed steerable, non-driven wheels at either end of the tandem body parts. In the present invention, only one set of non-driven steerable wheels are provided at the end of one of the body parts, while one of the sets of traction wheels under the other body part are steerable.

Still another object of the invention is to provide a new and improved front wheel suspension system for an articulated shuttle car which will prevent or materially reduce any transverse bending or twisting action of one body part with respect to the other as the vehicle travels over rough or uneven ground surfaces.

In accordance with the invention, there is provided an elongated body having a pair of tandem body parts which are connected at adjacent ends by pivot means extending transversely of the body, one of the body parts having two sets of tandem traction wheels or caterpillars located intermediate its ends, and the other body part having steerable, non-driven wheels on its forward end opposite the pivot means. In the preferred embodiment of the invention, the pair of tandem traction wheels on the one body part furthest removed from the pivot means are steerable together with the non-driven wheels at the forward end of the other body part. By proper adjustment of the turning rates of the respective pairs of steerable wheels, the elongated body may be made to turn about the non-steerable traction wheels, thereby minimizing any scraping or scrubbing of the vehicle tires on the ground surface. At the same time, by virtue of the fact that two sets of traction wheels are provided on one of the body parts, the traction characteristics of the vehicle are greatly improved over the case where motive force is applied to only one set of wheels.

The above and other objects and features of the invention will become apparent from the following detailed description taken in connection with the accompanying drawings which form a part of this specification, and in which.

Figure 1:
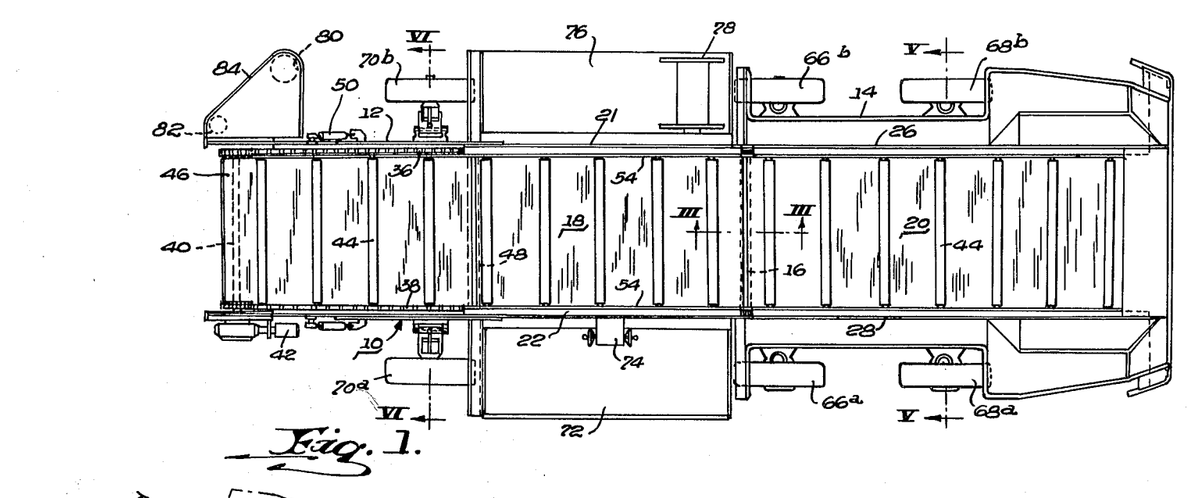
FIGURE 1 is a top plan view showing a preferred embodiment of the improved shuttle car of the present invention.
Figure 2:
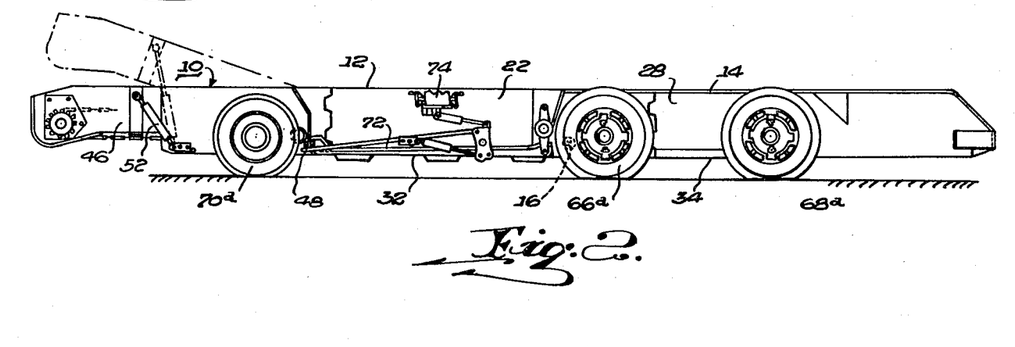
FIG. 2 is a side elevational view of the shuttle car shown in FIG. 1.
Figure 3:
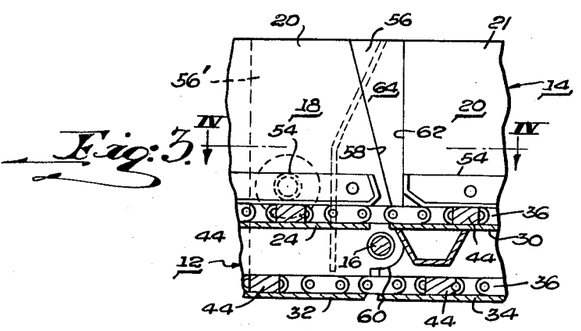
FIG. 3 is a cross-sectional view taken along line III—III of FIG. 1 showing the manner in which the articulated body sections of the shuttle car of the invention are pivotally interconnected.

Referring now to FIGS. 1, 2, 3 and 4, the embodiment of the invention shown comprises a material-carrying body 10 which is divided into two relatively articulating body sections 12 and 14 pivoted together about a transversely-extending axle or pivot, generally indicated at 16. Each of the relatively articulating body sections 12 and 14 is provided with a material-receiving compartment 18 or 20 which cooperates with the other compartment to provide an elongated chamber extending along the length of the body 10. Compartment 18, for example, is formed by side walls 21 and 22 and a floor 24 (FIG. 3). Similarly, the compartment 20 is formed by side walls 26 and 28 and a floor 30.

As shown in FIG. 3, beneath the floors 24 and 30 are sub-floors 32 and 34 for the respective body parts 18 and 20. The floors 24, 30, 32 and 34 cooperate to support the forward and return reaches of a pair of spaced chains 36 and 38 on either side of the material-receiving compartments 18 and 20. The chains 36 and 38 articulate around sprockets at the opposite ends of the body 10, the forward sprockets being connected (FIG. 1) to a shaft 40 which is driven by means of a hydraulic motor 42 on one side of the body. Extending between the chains 36 and 38 are a plurality of flights 44 which scrape along the floors 24 and 30 to force coal or other granular material from the right or entrance end of the shuttle car as viewed in FIG. 1 to the left or exit end.

Pivotally connected to the forward end of body part 12 between the side walls 21 and 22 is an elevatable boom 46 which pivots about a laterally-extending axle or bar 48 connected to and extending between the side walls 21 and 22. As shown, the chains 36 and 38 extend along the floor of the boom 46 as well as floors 24 and 30 of body parts 12 and 14; and the hydraulic motor 42 which drives the chains is also mounted on this boom. In order to elevate the boom, a pair of hydraulic cylinders 50 and 52 are connected between opposite sides of the boom and the side walls 21 and 22 of body part 12, the arrangement being such that the boom may be elevated into the position shown in dotted outline in FIG. 2 by expanding the cylinders. When it is desired to discharge the contents of the shuttle car onto a conveyor or into the material-receiving compartment of another vehicle, the boom 46 may be elevated by the cylinders 50 and 52 such that it will be raised above the side walls of that vehicle or above the level of the conveyor. As will be understood, the conveyor comprising chains 36 and 38 and the flights 44 is flexible in a vertical direction throughout its length so that it can readily articulate over the sprockets and the pivoted joints at 16 and 18.

Figure 4:
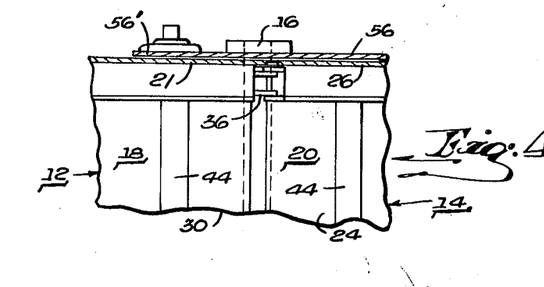
FIG. 4 is a cross-sectional view taken along line IV—IV of FIG. 3.

With specific reference to FIGS. 3 and 4, it will be noted that the forward reaches of the chains 36 and 38 travel between floors 24 and 30 and angles 54 which are secured to the respective side walls of material-receiving compartments 18 and 20. In order to permit one body part to pivot relative to the other, the side wall 26 of body part 14, for example, has a plate 56 connected thereto which has an extension 56' extending over the outside of side wall 21 of body part 12. The side wall 21, as shown in FIG. 3, is tapered as at 58 and terminates in a rounded portion 60 surrounding the pivot or axle 16. The side wall 26, on the other hand, is provided with a straight edge 62 which terminates in a rounded portion which cooperates with the rounded portion 60 on side wall 21 to permit the two body parts to pivot relative to each other. Between the ends 58 and 62 of side walls 21 and 26, respectively, is a triangularly-shaped space 64 which is covered on one side by the extension 56' of plate 56. The pivot or axle 16 is journalled within side wall 21 and plate 56 on one side of the body 10 and within side wall 22 and a corresponding plate on the opposite side of the body. Thus, if body part 14 should pivot relative to body part 12 in a counterclockwise direction as viewed in FIGS. 2 and 3, the triangular space 64 will decrease in width, and since the chains 36 and 38 are flexible in a vertical direction throughout their lengths, they will merely articulate over the pivotal axis between the body parts 12 and 14. In a similar manner, if body part 14 should rotate relative to body part 12 in a clockwise direction as viewed in FIGS. 2 and 3, then the triangular space 64 will increase in size. In all cases, however, due to the provision of plates 56 which extend over the opening 64, a continuous side barrier is provided for granular or other material in compartments 18 and 20 regardless of the manner in which the body parts articulate relative to each other.

Carried intermediate the ends of the body part 14 are pairs of tandem traction wheels 66a, 66b and 68a, 68b. As will hereinafter be seen, each of the traction wheels 66a, 66b, 68a and 68b is driven by a single prime mover, not shown in FIGS. 1 and 2. Traction wheels 68a, 68b are steerable while traction wheels 66a, 66b are non-steerable. On the forward end of body part 12 are a pair of steerable, non-driven wheels 70a, 70b. As will be seen, the wheels 70a, 70b cooperate with wheels 68a, 68b to steer the shuttle car about a vertical axis which coincides with the axis of rotation of non-steerable wheels 66a, 66b.

Figures 16, 17, 18:
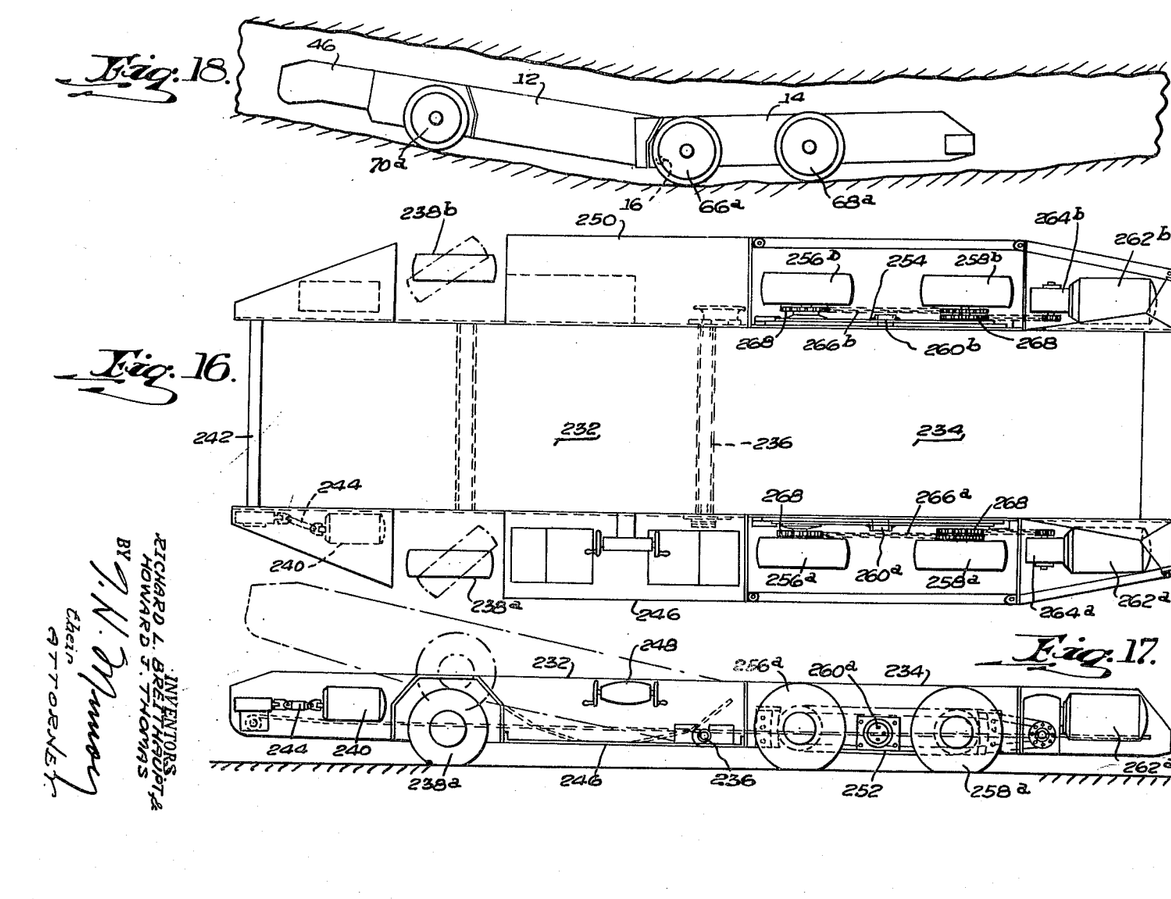
FIG. 16 is a top or plan view of still another embodiment of the invention employing a chain drive.
FIG. 17 is a side view of the embodiment of the invention shown in FIG. 16.
FIG. 18 is a side elevational view showing the shuttle car of FIGS. 1 and 2 in an articulated state as the car is proceeding over a mine floor fall.

With reference to FIG. 18, it can be readily seen that by virtue of the pivoted connection at 16 between the body parts 12 and 14, the vehicle may easily articulate over rough and uneven ground surfaces in the mine roadway 69 without the bottom or top of the vehicle scraping on the bottom or top, respectively, of the mine roadway. At the same time, by virtue of the increased length of the vehicle afforded by the articulated body sections, the load-carrying capacity of the car may be greatly increased over the case where a unitary, rigid vehicle body is employed.

Referring, again, to FIGS. 1 and 2, secured to side walls 22 of body part 12 is an operator's platform 72 adapted to support an operator in a reclining or sitting position. Also supported on side wall 22 is a steering wheel mechanism 74 which may be manipulated by the operator on platform 72 in order to steer the wheels 68a, 68b and 70a, 70b. Secured to side wall 21 on the opposite side of body part 12 is a compartment 76 for a conventional electric cable reel 78 on which a power conductor cable, not shown, is wound. In accordance with usual procedure, the power conductor cable is guided by means of a pair of sheaves 80 and 82 carried between plates 84 which are supported on one side of the boom 46.

Figure 5:
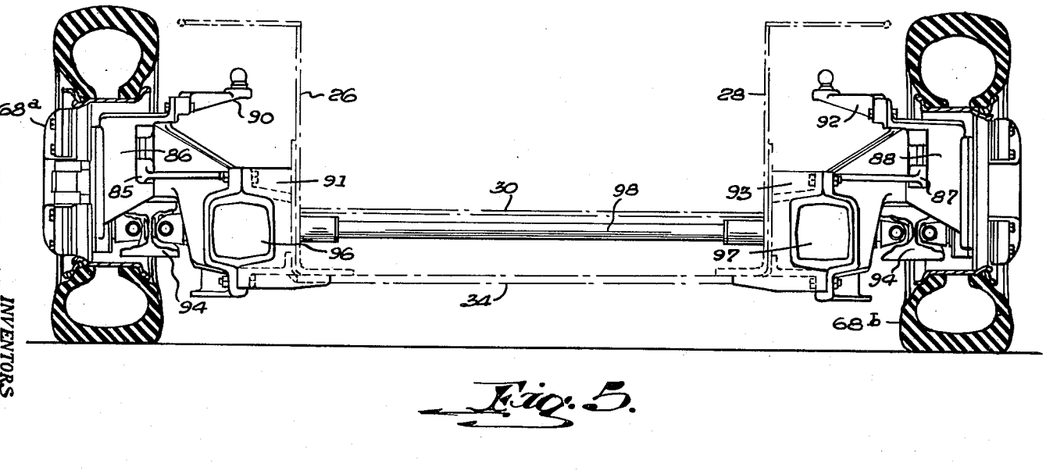
FIG. 5 is a cross-sectional view taken along line V—V of FIG. 1 illustrating the detailed construction of the steerable drive wheels of the embodiment of the invention shown in FIGS. 1 and 2.

Referring now to FIG. 5, the steerable traction wheels 68a and 68b are carried on kingpin assemblies 85 and 87 which support rotatable trunnions 86 and 88 having steering knuckles 90 and 92 thereon adapted for connection to the steering mechanism, hereinafter described in detail. The kingpin assemblies 85 and 87, in turn, are secured to brackets 91 and 93 carried on the side walls 26 and 28 of body part 14. Traction wheels 68a and 68b are given by means of pinion and ring gear arrangements carried within the wheel housings, the pinion gears being connected through universal joints 94 to differentials 96 and 97. Interconnecting the differentials 96 and 97 is a cross shaft 98. Thus, with the arrangement shown, the wheels 68a and 68b may be forcibly rotated by rotating a drive shaft, not shown, connected to either one of the differentials 96 or 97. At the same time, the wheels may be rotated about their associated kingpin assemblies 85 and 87 by steering knuckles 90 and 92 due to the fact that the wheels are connected to the differentials 96 and 97 through universal joints 94 which provide flexible couplings between the wheels and the differentials. The arrangement of the non-steerable traction wheels 66a and 66b is similar to that of the steerable traction wheels shown in FIG. 5, except that the rotatable trunnions 86 and 88 are locked to the kingpin assemblies 85 and 87 so as to render them non-steerable.

Figures 6, 8:
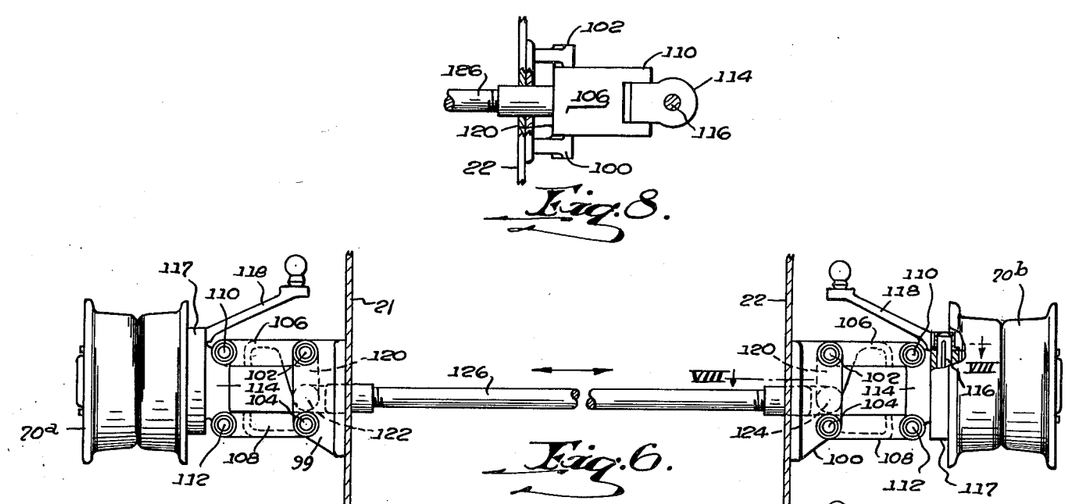
FIG. 6 is a cross-sectional view taken along line VI—VI of FIG. 1 showing the detailed construction of the front wheel suspension system of the embodiment of the invention shown in FIGS. 1 and 2.
FIG. 8 is a cross-sectional view taken along line VIII—VIII of FIG. 6, showing the top of the parallelogram arrangement of the front wheel suspension system of FIGS. 6 and 7.
Figure 7:
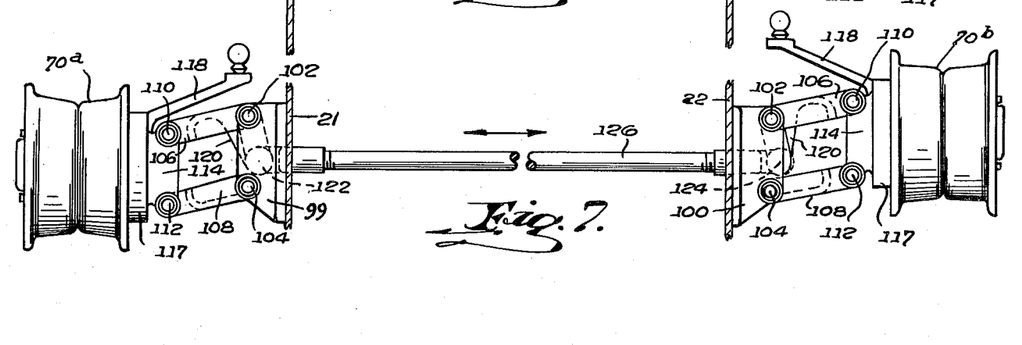
FIG. 7 is a cross-sectional view, similar to FIG. 6, showing the manner in which the front wheel suspension system may articulate over rough or uneven ground surfaces.

Referring now to FIGS. 6, 7 and 8, the front wheel suspension system for non-driven, steerable wheels 70a and 70b includes a pair of brackets 99 and 100 secured to the outside surfaces of side walls 21 and 22 of body part 12. Connected to each of the brackets 99 and 100 about pivot axes 102 and 104 are parallel arms or trunnions 106 and 108, respectively, which are pivotally connected as at 110 and 112 to kingpin assemblies, generally indicated at 114. The kingpin assemblies 114 are each provided with kingpins 116 which receive, for pivotal movement, the bearing assemblies 117 for wheels 70a and 70b. Connected to the bearing assemblies 117 are steering knuckles 118 which are connected to a steering mechanism, hereinafter described in detail, adapted to pivot the bearing assemblies 117 and the wheels 70a and 70b carried thereby to effect steering of the vehicle. Integral with the arms or trunnions 106 are downwardly-extending portions 120 which are pivotally connected as at 122 and 124 to a crossbar 126.

From a consideration of the suspension system shown in FIGS. 6, 7 and 8, it will be understood that the elements 106 and 108 together with elements 114 and 99 or 100 comprises a parallelogram arrangement wherein elements 106 and 108 will always be parallel as will elements 114 and 99 or 100. Furthermore, by virtue of the connection between elements 106 through crossbar 126, any lowering of wheel 70a, for example, will be accompanied by a corresponding rise in wheel 70b while the crossbar 126 remains parallel to the transverse axis of the vehicle. This is shown, for example, in FIG. 7 where wheel 70a has fallen while wheel 70b has been elevated. Thus, if the forward end of the vehicle should be on a grade extending transversely of the body 10, one of the wheels 70a or 70b, will rise while the other falls, however, the floors 24, 30, 32 and 34 will remain in a substantially horizontal plane as will the chains 36 and 38 carried thereby. As the shuttle car moves over rough or uneven ground surfaces, therefore, changes in the grade of the surface will be reflected by a raising or lowering of the wheels 70a and 70b through their parallelogram linkages while body part 12 remains in substantially the same plane as body part 14. This prevents any substantial binding or twisting of one body part with respect to the other along pivot 16 which might otherwise occur.

Figure 9:
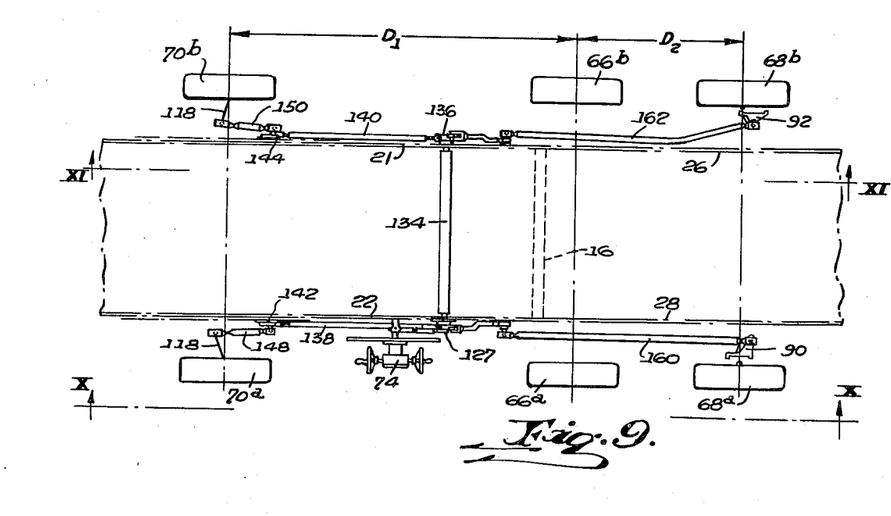
FIG. 9 is a schematic illustration, as viewed from the top, of the steering mechanism for the embodiment of the invention shown in FIGS. 1 and 2.
Figure 10:
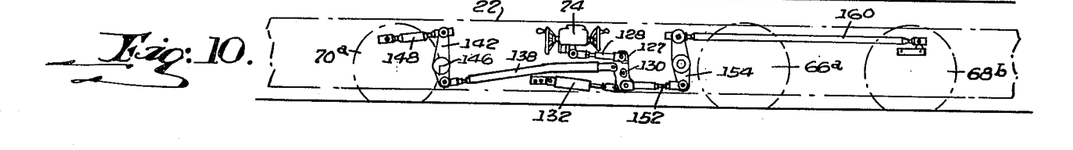
FIG. 10 is a view of one side of the steering mechanism of FIG. 9 taken substantially along line X—X of FIG. 9.
Figure 11:
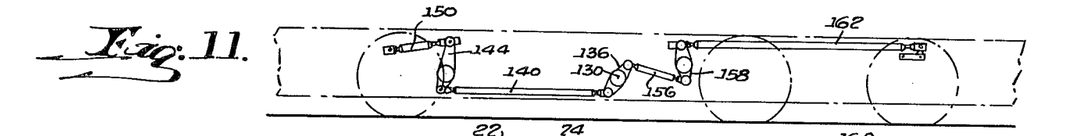
FIG 11 is a view of the other side of the steering mechanism of FIG. 9 taken substantially along line XI—XI of FIG. 9.

Referring now to FIGS. 9, 10 and 11, the steering system for the embodiment of the invention shown in FIGS. 1 and 2 includes the steering wheel mechanism 74 which is connected through linkages 128 to a lever or arm 127 pivotally connected to side wall 22 as at 130. Rotation of the steering wheel mechanism 74 by the operator also serves to pressurize a hydraulic cylinder 132 in one direction or the other, depending upon the direction of rotation of the steering wheel. In this respect, the hydraulic cylinder 132 comprises a power steering arrangement. If the operator turns the steering wheel mechanism so as to rotate arm 127 in a clockwise direction, appropriate valves, not shown, in the steering wheel mechanism 74 will also act to pressurize the cylinder 132 to assist in the clockwise rotation of the arm 127. Similarly, if the direction of rotation of steering wheel mechanism 74 is reversed, then the cylinder 132 will also be pressurized in the opposite direction to assist in rotating the arm 127 in a counterclockwise direction.

As is best shown in FIG. 9, the arm 127 is connected through crossbar 134 to a similar arm 136 carried on side wall 21 at the opposite side of body 10. Each of the arms 127 and 136 is connected through linkages 138 and 140, respectively, to the lower end of an arm 142 or 144 pivotally connected to the side walls 21 and 22 as at 146. The upper ends of arms 142 and 144 are, in turn, connected to the steering knuckles 118 on the non-driven, steerable wheels 70a and 70b through linkages 148 and 150. As will be understood, the linkages 148 and 150 are connected to the arms 142, 144 and the steering knuckles 118 by means of ball and socket joints to permit a universal coupling action therebetween.

It will be noted that whereas linkage 138 is connected to arm 127 above pivot point 130, the linkage 140 is connected to arm 136 below the pivot point 130. Consequently, when arms 127 and 136 are rotated in a counterclockwise direction as viewed in FIGS. 10 and 11, linkage 138 will move forwardly while linkage 140 moves backwardly. This, in turn, causes arm 142 to rotate in a clockwise direction and arm 144 to rotate in a counterclockwise direction with the result that linkage 148 is pulled backwardly while linkage 150 is pushed forwardly. As a result both of the wheels 70a and 70b pivot about their vertical axes as viewed in FIG. 6 in clockwise directions to cause the vehicle to be steered in one direction. Conversely, when the steering wheel mechanism 74 is rotated in the opposite direction to cause the arms 127 and 136 to rotate in clockwise directions as viewed in FIGS. 10 and 11, the front wheels 70a and 70b will be caused to rotate about their vertical axes in the opposite direction (i.e., counterclockwise) to cause the vehicle to be steered in the opposite direction.

In a somewhat similar manner, the bottom of arm 127 on side wall 22 is connected through linkage 152 to the bottom of an arm 154 on one side of the vehicle while the top of arm 136 is connected through linkage 156 to the bottom of a second arm 158 on the other side of the vehicle. The tops of arms 154 and 158 are then connected through linkages 160 and 162, respectively, to the steering knuckles 90 and 92 on the steerable traction wheels 68a and 68b, respectively. Thus, when the arms 127 and 136 are rotated in a counterclockwise direction, arm 154 will be caused to rotate in a counterclockwise direction also whereas arm 158 on the other side of the vehicle will be caused to rotate in a clockwise direction. This will cause linkage 160 to move forwardly and linkage 162 to move backwardly to cause both of the wheels 68a and 68b to rotate about their vertical kingpin assemblies 85 and 87 in counterclockwise directions as viewed in FIG. 9. Rotation of the arms 127 and 136 in a clockwise direction will, of course, reverse the direction of rotation of wheels 68a and 68b about their kingpin assembiles. Since the linkages 138, 152 and 140, 156 are connected to opposite ends of the arms 127 and 136, whenever wheels 70a and 70b are caused to rotate about their vertical steering axes in a clockwise direction, the wheels 68a and 68b will be caused to rotate in a counterclockwise direction about their vertical steering axes, and vice versa.

The distance $D_1$ between the axes of wheels 70a, 70b and 66a, 66b is twice the distance $D_2$ between the axes of wheels 66a, 66b and 68a, 68b. As will be understood, it is highly desirable to have the vertical axis of steering of the vehicle intersect the axis of non-steerable wheels 66a and 66b in order to minimize the amount of scrubbing or scraping of these wheels over the ground surface when the vehicle is turned. In order to effect this result, the steering system is designed such that for a given increment of travel of the steering wheel mechanism 74, the front wheels 70a, 70b will rotate through twice the number of degrees as the rear driven wheels 68a, 68b. That is, the centers of rotation of arms 127, 136, 142, 144, 154 and 158 are chosen whereby rotation of the front wheels 70a, 70b through two degrees, for example, will result in rotation of the rear driven wheels 68a, 68b through only one degree. In this manner, the vertical axis of rotation of the body 10 during steering of the vehicle will always substantially intersect the axes of wheels 66a, 66b.

Figure 12:
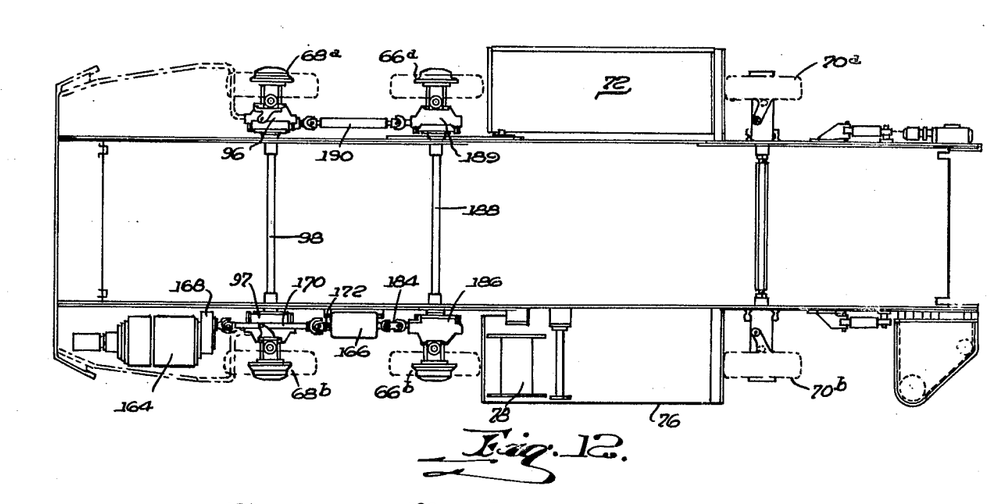
FIG. 12 is a top or plan view showing the wheel drive means of the embodiment of the invention of FIGS. 1 and 2.
Figure 13:
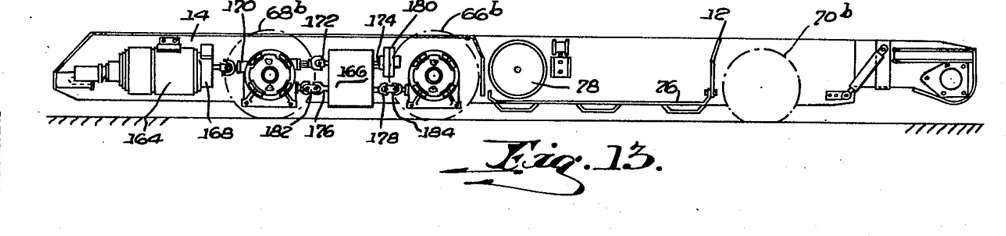
FIG. 13 is a side elevation of the wheel drive system shown in FIG. 12.

Referring now to FIGS. 12 and 13 arranged on one side of the body 10 adjacent the tandem sets of drive wheels 66a, 66b, 68a, 68b is an electric motor 164 which may be either of the alternating current or direct current type. Arranged at the same side of the body 10, between the traction wheels 66b and 68b is a selective, reversible multi-speed transmission 166 under the control of the operator in operator's compartment 72. The motor 164 is connected through a coupling or clutch 168 to a universal shafting 170 extending longitudinally at one side of the body; and this shafting is, in turn, connected to the input shaft 172 of the selective transmission 166. The transmission 166 is provided with three output shafts 174, 176 and 178. Output shaft 174 is connected directly to input shaft 172 and is employed to drive a hydraulic pump 180 (shown in FIG. 13 only) which supplies fluid under pressure to drive the hydraulic motor 42 and pressurize cylinders 50 and 52 to elevate the boom 46. Output shaft 176 is connected through universal shafting 182 to differential 97 shown in FIG. 5. In a similar manner, output shaft 178 is connected through universal shafting 184 to a differential 186 which is identical in construction to differential 96 on wheel 68b. As was explained in connection with FIG. 4, a cross shaft 98 connects differential 96 associated with wheel 68b to the differential 97 associated with wheel 68a. In a similar manner, differential 186 associated with wheel 66b is connected through cross shaft 188 to a similar differential 189 associated with wheel 68a. The differentials 96 and 189 associated with wheels 68a and 68b, respectively, are interconnected by universal shafting 190, substantially as shown. With the arrangement shown, all of the wheels 68a, 68b and 66a, 66b will be driven through the transmission 166; however, each wheel may rotate independently of the others, assuming that the frictional resistance presented to one wheel differs from that presented to another.

The drive arrangement of FIGS. 12 and 13 enables the use of a single prime mover 164 for all four drive wheels; and in this respect the embodiment of the invention shown in FIGS. 12 and 13 follows the general teachings of Lee Patent 2,754,015, issued July 10, 1956. The use of a single prime mover is, of course, advantageous in that it simplifies the construction and maintenance of the shuttle car.

Figure 14:
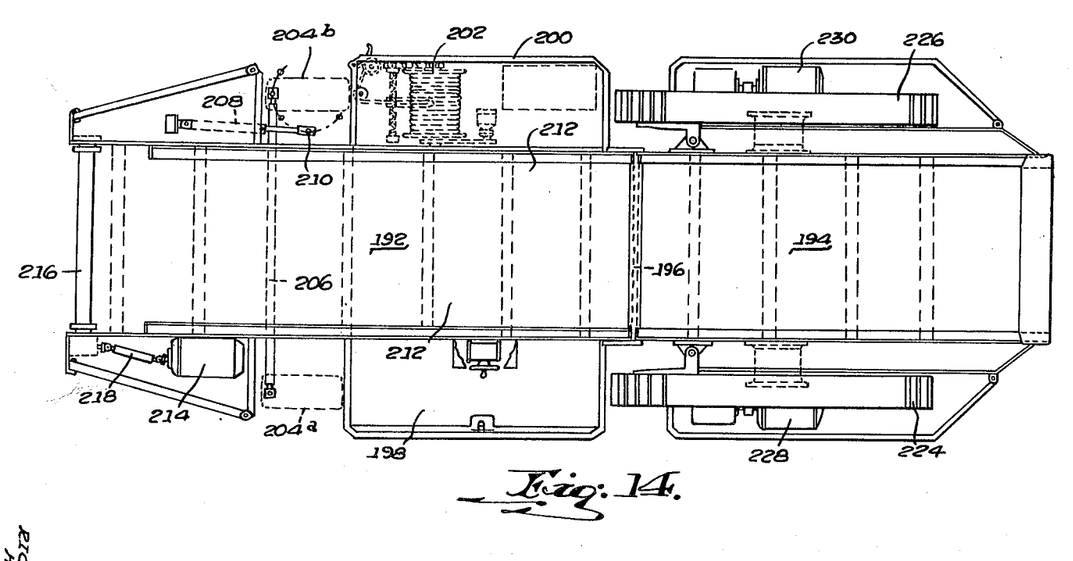
FIG. 14 is a top or plan view of another embodiment of the invention employing a caterpillar drive.
Figure 15:
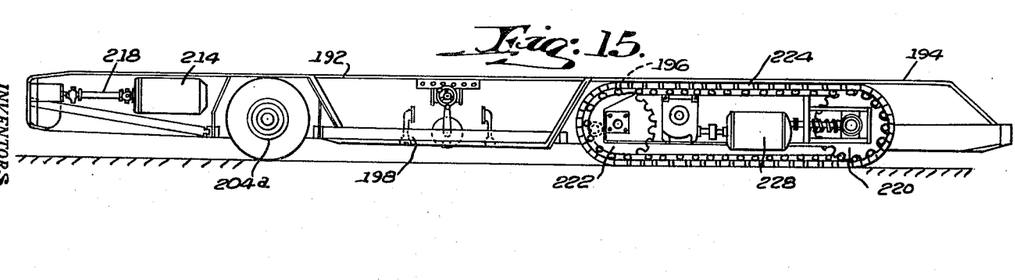
FIG. 15 is a side view of the embodiment of the invention shown in FIG. 14.

Referring, now, to FIGS. 14 and 15, another embodiment of the invention is shown which is of the same general configuration as the shuttle car of FIGS. 1 and 2. Accordingly, only the salient features of the embodiment of FIGS. 14 and 15 will be described. It comprises a pair of relatively articulating body sections 192 and 194 pivotally connected together at their adjacent ends by pivot means, generally indicated at 196. Both of the body sections are provided with communicating material-receiving compartments as was the case with the embodiment of FIGS. 1 and 2. Body part 192 is provided on one side with an operator's compartment 198 and on the opposite side with a second compartment 200 which carries a cable reel 202. Suspended on the body part 192 by a suitable wheel suspension system, not shown, are a pair of steerable, non-driven wheels 204a and 204b interconnected by means of a crossbar 206 which will cause both wheels 204a, 204b to rotate in either direction in synchronism. In contrast to the steering system employed in the embodiment of FIGS. 1 and 2, the embodiment of FIGS. 14 and 15 employs a single hydraulic cylinder 208 having its piston rod connected to a kingpin assembly on wheel 204b as at 210. Thus, by pressurizing the cylinder 208 in one direction, the wheels 204a, 204b will be caused to pivot in one direction; while pressurization of cylinder 208 in the opposite direction will cause the wheels to pivot in the opposite direction. The flight conveyor 212 which extends along the floor of body parts 192 and 194 is driven by means of an independent electric motor 214 connected to a drive shaft 216 for the conveyor through universal shafting 218.

Intermediate the ends of body part 194 on either side thereof is a driven sprocket 220 and an idler sprocket 222. Movable around the sprockets 220 and 222 on opposite sides of body part 194 are continuous caterpillars 224 and 226. As shown, the sprockets 220 on opposite sides of body part 194 are driven by separate electric motors 228 and 230 carried between the upper and lower reaches of the caterpillars 224 and 226. The motors 228 and 230 are controlled in an obvious manner by the operator's controls in the compartment 198. With this embodiment, exceptionally good traction characteristics will be obtained by virtue of the caterpillar drive, however considerably more difficulty will be experienced in steering the vehicle than in the case of the shuttle car of FIGS. 1 and 2. In addition, it requires three separate drive motors 214, 228 and 230 rather than the single drive motor of the former embodiment.

Referring now to FIGS. 16 and 17, still another embodiment of the invention is shown which again includes a pair of relatively articulating body parts 232 and 234 pivotally connected together at their adjacent ends by means of a transversely-extending shaft 236. The forward end of body part 232 is provided with steerable wheels 238a, 238b and the conveyor, not shown, which extends along the bottom of the body parts 232 and 234 is driven by an electric motor 240 connected to drive shaft 242 for the conveyor through universal shafting 244. On one side of the body part 232 is an operator's compartment 246 having a steering wheel mechanism 248 therein; whereas the other side of the body part 232 is provided with a second compartment 250 for a cable reel, not shown.

Pivotally connected to the sides of body part 234, intermediate its ends, are a pair of walking beams 252 and 254 which carry sets of tandem driving wheels 256a, 256b and 258a, 258b at their opposite ends. With the arrangement shown, the walking beams 252 and 254 may pivot or articulate about the pivot points 260a and 260b to facilitate movement of the vehicle over rough or uneven ground surfaces. The sets of tandem drive wheels 256a, 256b and 258a, 258b are driven by a pair of electric motors 262a and 262b on either side of the body connected to transmissions or gear reducers 264a and 264b. The output shafts of the transmissions are, in turn, connected through chain drives 266a and 266b to sprockets 268 on the sets of tandem drive wheels.

This embodiment of the invention has the disadvantage over the embodiments of FIGS. 1 and 2 of requiring separate drive motors 262a and 262b for each set of tandem drive wheels. On the other hand, it has the advantage of eliminating the more complicated drive system of the embodiments of FIGS. 1 and 2. Whereas the embodiment of FIGS. 1 and 2 is provided with an elevatable boom at the forward end of body part 12, the embodiments of FIGS. 14, 15, 16 and 17 do not include such an arrangement. Thus, in order to elevate the forward end of body part 232 of the embodiments of FIGS. 16 and 17, for example, it will be necessary to move the front steerable wheels 238a and 238b onto an inclined ramp or other similar means. The front wheels 238a and 238b of the embodiment of FIGS. 16 and 17 may be steered in any manner desired, however it is preferred that they be actuated by means of a hydraulic cylinder similar to cylinder 208 shown in FIG. 14. As will be understood, the steering angle of the embodiments of FIGS. 14, 15, 16 and 17 will be much less than that of the embodiment of FIGS. 1 and 2 due to the fact that in the latter embodiment one set of tandem driving wheels 68a and 68b are steerable; whereas in the former embodiments this is impossible due to the caterpillar drive arrangement or the walking beam arrangement, respectively. The design for the shuttle car employed for a particular application will, of course, depend upon the specific requirements of that application.

The present invention thus provides a new and improved articulated shuttle car arrangement which employs sets of tandem drive wheels under one of the body parts to increase the traction characteristics of the vehicle while providing a means whereby a single drive means may be employed to drive all of the traction wheels, if desired. Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. A haulage vehicle comprising an elongated body having a pair of tandem body parts which are connected at adjacent ends by pivot means to permit said body parts to freely pivot relative to each other about a pivot axis extending laterally of said body, one of said body parts having sets of tandem traction wheels located intermediate its ends, the set of traction wheels furthest removed from said pivot means being steerable about generally vertical axes while the set of traction wheels closest to said pivot means being non-steerable, wheels steerable about generally vertical axes on the end of the other body part opposite said pivot means, cooperating chambers extending longitudinally of said body parts to provide a trough-shaped compartment extending substantially throughout the length of said elongated body, the steerable wheels on said one body part being closer to said pivot axis than those on the other body part, and means including linkages extending along opposite sides of said body parts at either side of the trough-shaped compartment and connected to the steerable wheels for forcibly rotating said steerable wheels on the one body part while simultaneously forcibly rotating the steerable wheels on the other body part in opposite directions about their respective vertical axes to effect steering of the vehicle, said means for forcibly rotating the steerable wheels being such that the amount of rotation of the steerable wheels about their vertical axes on the one body part with respect to the opposite rotation of those on the other body part will be in proportion to the distances of the respective steerable wheels from the axis of said non-steerable wheels, whereby the vertical axis of rotation of the vehicle will substantially intercept the horizontal axis of said non-steerable wheels.

2. A haulage vehicle comprising an elongated body having a pair of tandem body parts which are connected at adjacent ends by pivot means to permit said body parts to freely pivot relative to each other about a pivot axis extending laterally of said body, one of said body parts having sets of tandem traction wheels located intermediate its ends, the set of traction wheels furthest removed from said pivot means being steerable about generally vertical axes while the set of traction wheels closest to said pivot means being non-steerable, wheels steerable about generally vertical axes on the end of the other body part opposite said pivot means, cooperating chambers extending longitudinally of said body parts to provide a trough-shaped compartment extending substantially throughout the length of said elongated body, and means for forcibly rotating said steerable wheels on said one body part in one direction while simultaneously forcibly rotating the steerable wheels on the other body part in the opposite direction about their respective vertical axes to thereby effect steering of the vehicle, said means for forcibly rotating the steerable wheels comprising a shaft extending transversely of said one body part, arms secured to opposite ends of said shaft and having portions extending above and below said shaft, linkage assemblies on one side of said elongated body connecting the lower and upper portions of the arm on one end of said shaft to the steerable wheels on said one side of the elongated body, and linkage assemblies on the other side of said elongated body connecting the lower and upper portions of the arm on the other end of said shaft to the steerable wheels on said other side of the elongated body.

3. The haulage vehicle of claim 2 wherein the linkage assemblies between the arms on opposite ends of said shaft and the steerable wheels on said one body part each include an auxiliary arm carried on said one body part and pivotal about a generally horizontal axis, said auxiliary arm having portions extending above and below said horizontal axis, a first linkage bar connecting one portion of said auxiliary arm to a portion of one of said first-mentioned arms, and a second linkage bar connecting the other portion of the auxiliary arm on said one body part to an associated one of the steerable traction wheels on said one body part.

4. A haulage vehicle comprising an elongated body having a pair of tandem body parts which are connected at adjacent ends by pivot means to permit said body parts to freely pivot relative to each other about a pivot axis extending laterally of said body, one of said body parts having sets of tandem traction wheels located intermediate its ends, the set of traction wheels furthest removed from said pivot means being steerable about generally vertical axes while the set of traction wheels closest to said pivot means being non-steerable, a single prime mover for forcibly rotating all of said traction wheels, driving connections between said prime mover and all of said traction wheels, wheels steerable about generally vertical axes on the end of the other body part opposite said pivot means, cooperating chambers extending longitudinally of said body parts to provide a trough-shaped compartment extending substantially throughout the length of said elongated body, and means for forcibly rotating said steerable wheels on said one body part in one direction while simultaneously forcibly rotating the steerable wheels on the other body part in the opposite direction about their respective vertical axes to thereby effect steering of the vehicle.

5. The haulage vehicle of claim 4 wherein the driving connections between said prime mover and all of said traction wheels includes at least one shaft operatively connected to said traction wheels and extending transversely of the lower portion of said one body part.

References Cited by the Examiner

UNITED STATES PATENTS

| | | | |
|---|---|---|---|
| 2,367,151 | 1/45 | Stephen | 180—24 |
| 2,754,015 | 7/56 | Lee | 214—83.36 |
| 2,962,176 | 11/60 | Russell | 214—83.36 |
| 2,985,251 | 5/61 | Tellier | 180—22 |
| 3,008,592 | 11/61 | Johnson | 214—83.36 |

HUGO O. SCHULZ, *Primary Examiner.*